US 8,762,384 B2

(12) United States Patent
Heidasch

(10) Patent No.: US 8,762,384 B2
(45) Date of Patent: Jun. 24, 2014

(54) METHOD AND SYSTEM FOR SEARCH STRUCTURED DATA FROM A NATURAL LANGUAGE SEARCH REQUEST

(75) Inventor: Robert Heidasch, Speyer (DE)

(73) Assignee: SAP Aktiengesellschaft, Walldorf (DE)

( * ) Notice: Subject to any disclaimer, the term of this patent is extended or adjusted under 35 U.S.C. 154(b) by 499 days.

(21) Appl. No.: 12/859,552

(22) Filed: Aug. 19, 2010

(65) Prior Publication Data

US 2012/0047145 A1    Feb. 23, 2012

(51) Int. Cl.
*G06F 17/30* (2006.01)

(52) U.S. Cl.
USPC ........... 707/741; 707/739; 707/747; 707/748; 707/756

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 5,666,210 A * | 9/1997 | Yanai et al. | ................... | 358/402 |
| 5,732,216 A * | 3/1998 | Logan et al. | ................. | 709/203 |
| 5,777,989 A * | 7/1998 | McGarvey | .................... | 370/254 |
| 5,826,025 A * | 10/1998 | Gramlich | ..................... | 709/217 |
| 5,867,665 A * | 2/1999 | Butman et al. | ................. | 709/239 |
| 5,870,562 A * | 2/1999 | Butman et al. | ................. | 709/238 |
| 5,874,960 A * | 2/1999 | Mairs et al. | .................... | 715/733 |
| 6,016,508 A * | 1/2000 | Chu et al. | ...................... | 709/223 |
| 6,043,898 A * | 3/2000 | Jacobs | ........................ | 358/1.15 |
| 6,052,784 A * | 4/2000 | Day | ................................ | 726/22 |
| 6,081,829 A * | 6/2000 | Sidana | ........................... | 709/203 |
| 6,163,807 A * | 12/2000 | Hodgkinson et al. | .......... | 709/229 |
| 6,167,402 A * | 12/2000 | Yeager | .................................. | 1/1 |
| 6,178,160 B1 * | 1/2001 | Bolton et al. | .................. | 370/255 |
| 6,212,565 B1 * | 4/2001 | Gupta | ........................... | 709/229 |
| 6,381,627 B1 * | 4/2002 | Kwan et al. | .................... | 709/201 |
| 6,393,456 B1 * | 5/2002 | Ambler et al. | ................ | 709/200 |
| 6,411,966 B1 * | 6/2002 | Kwan et al. | ............................ | 1/1 |
| 6,438,580 B1 * | 8/2002 | Mears et al. | ................... | 709/204 |
| 6,525,747 B1 * | 2/2003 | Bezos | ........................... | 715/751 |
| 7,068,384 B1 * | 6/2006 | Hou | ............................. | 358/1.15 |
| 7,092,870 B1 * | 8/2006 | Chen et al. | ........................ | 704/9 |
| 7,370,285 B1 * | 5/2008 | Nickerson et al. | ............ | 715/808 |
| 7,500,221 B2 * | 3/2009 | Baumann | ....................... | 717/110 |
| 7,735,101 B2 * | 6/2010 | Lanza et al. | ..................... | 725/32 |
| 7,793,211 B2 * | 9/2010 | Brenner | ........................ | 715/230 |
| 7,870,480 B1 * | 1/2011 | Oswald et al. | ................ | 715/231 |
| 7,908,312 B2 * | 3/2011 | Kang et al. | ..................... | 709/201 |
| 7,921,026 B2 * | 4/2011 | O'Cull et al. | ................ | 705/7.23 |
| 7,996,774 B1 * | 8/2011 | Sidenur et al. | ................ | 715/743 |
| 8,099,673 B2 * | 1/2012 | Parkinson | ...................... | 715/762 |

(Continued)

OTHER PUBLICATIONS

Cohen, Sara, "XSEarch: A Semantic Search Engine for XML," ACM Proceedings of the 29th VLDB Conference, Berlin, Germany, 2003, pp. 1-12.*

(Continued)

*Primary Examiner* — Farhan Syed
(74) *Attorney, Agent, or Firm* — Blakely, Sokoloff, Taylor & Zafman LLP

(57) ABSTRACT

A method and system for performing a semantic search on structured data. An unstructured search query is received from a requestor. The query is evaluated within a computer to identify a best structured request based on the unstructured search query. The selected structured request is applied to a set of structured data. The result of the application of the structured request is then returned to the requestor.

12 Claims, 3 Drawing Sheets

(56) References Cited

U.S. PATENT DOCUMENTS

| | | | |
|---|---|---|---|
| 2002/0078152 A1* | 6/2002 | Boone | 709/204 |
| 2003/0097410 A1* | 5/2003 | Atkins et al. | 709/206 |
| 2004/0049534 A1* | 3/2004 | Nickerson et al. | 709/203 |
| 2005/0027589 A1* | 2/2005 | Jenkins et al. | 705/11 |
| 2005/0114271 A1* | 5/2005 | Sindambiwe | 705/67 |
| 2005/0267792 A1* | 12/2005 | Mehrotra et al. | 705/9 |
| 2006/0242139 A1* | 10/2006 | Butterfield et al. | 707/5 |
| 2007/0043617 A1* | 2/2007 | Stein et al. | 705/14 |
| 2007/0156622 A1* | 7/2007 | Akkiraju et al. | 706/48 |
| 2007/0250791 A1* | 10/2007 | Halliday et al. | 715/808 |
| 2008/0016091 A1* | 1/2008 | Chandra | 707/100 |
| 2008/0281803 A1* | 11/2008 | Gentric | 707/5 |
| 2010/0070448 A1* | 3/2010 | Omoigui | 706/47 |
| 2010/0095211 A1* | 4/2010 | Kenvin et al. | 715/723 |
| 2010/0153403 A1* | 6/2010 | Chang et al. | 707/747 |
| 2011/0047148 A1* | 2/2011 | Omoigui | 707/723 |
| 2011/0154192 A1* | 6/2011 | Yang et al. | 715/256 |
| 2011/0208847 A1* | 8/2011 | Lim et al. | 709/222 |
| 2011/0246222 A1* | 10/2011 | Kroon et al. | 705/2 |
| 2011/0270815 A1* | 11/2011 | Li | 707/706 |

OTHER PUBLICATIONS

Li, Quanzhong et al., "Indexing and Querying XML Data for Regular Path Expressions," Proceedings of the 27th VLDB Conference, Roma, Italy 2001, pp. 1-10.*

McIlraith, Sheila, et al., "Semantic Web Services," 2001, IEEE Inteligent Systems, pp. 46-53.*

Koutsomitropoulos, Dimitrios, et al., "A Structured Semantic Query Interface for Reasoning-Based Search and Retrieval," May 2005, University of Patras, Greece—Computer Engineering and Informatics Dept., School of Engineering, pp. 1-15.*

Volkel, Max., et al., "Semantic Wikipedia," Jun. 11-14, 2006, ACM 3rd European Semantic Web Conference (ESWC 2006), pp. 1-2.*

Weikum, Gerhard, et al., "Towards a Statistically Semantic Web," 2004, Springer-Verlag Berlin Heidelberg, pp. 3-17 (15 total pages).*

* cited by examiner

METHOD AND SYSTEM FOR SEARCH STRUCTURED DATA FROM A NATURAL LANGUAGE SEARCH REQUEST

FIELD

Embodiments of the invention relate to searching of structured data. More specifically, embodiments relate to performing an attributed semantic search on structured data.

BACKGROUND

With the vast amount of data, including business data retained for an enterprise, efficient searching techniques are required to render the data useable. Some search engines permit the searching of structured sources, such as business objects with different elements and groups. Other search engines are suitable for searching unstructured sources, such as documents in a file system or content on the Internet. To search structured sources, it is necessary to provide a recognized attribute and a corresponding attribute value. For example, "purchase order number" and a value may return business object instances having the attribute "purchase order number" and the specified value or range of values. The structure of the request required to form the search tends to be quite rigid and not conducive to the use of natural language, synonyms, acronyms, etc. This rigidity requires a particular skill to effectively search structured data to achieve meaningful results. It would be desirable to reduce this rigidity to enhance usability and reduce the skill required to manipulate and retrieve the desired data from structured sources.

SUMMARY

A method and system for performing a semantics search on structured data is disclosed. An unstructured search query is received from a requestor. The query is evaluated within a computer to identify a best structured request based on the unstructured search query. The selected structured request is applied to a set of structured data. The result of the application of the structured request is then returned to the requestor.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to an or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
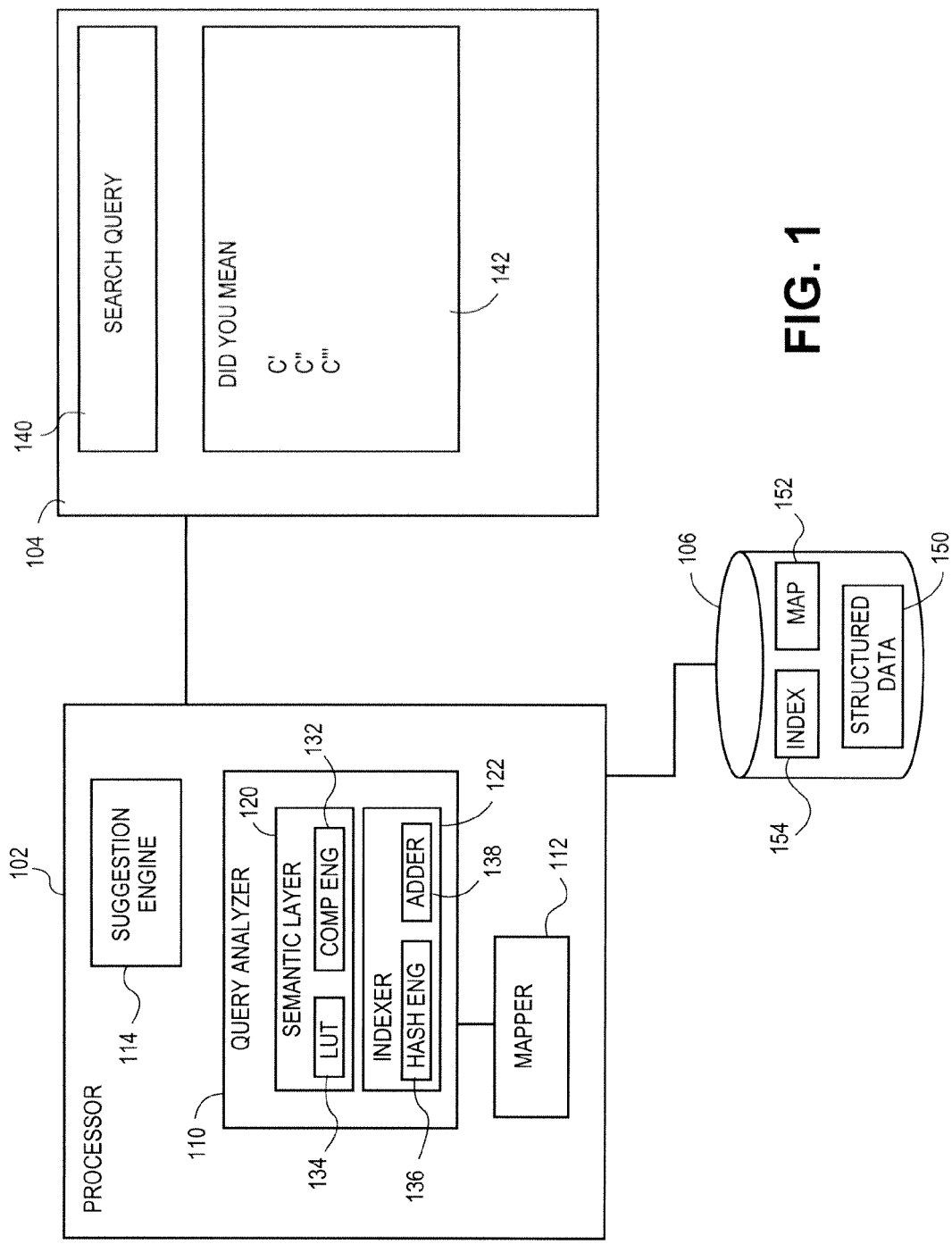
FIG. 1 is a block diagram of a system of one embodiment of the invention.

FIG. 1 is a block diagram of a system of one embodiment of the invention. A processor 102 is connected to a display 104 and a persistent storage unit, such as database 106. Database 106 includes an index 154 of input attributes and input attribute combinations may be used to form a structured search. Persistent storage 106 also includes a set of structured data 150 to be searched using a structured request. Persistent storage 106 may also include a map 152 which maps synonyms, acronyms, and semantically related terms to input attributes. Such terms are referred to here as semantic attributes. A mapper 112 in processor 102 may add relations between semantic attributes and input attributes to the map 152 in persistent storage 106. In some embodiments, map 152 may include contextual relations. For example, "order" may be mapped to an input attribute "purchase order number," but if the request is from the sales department, "order number" may automatically map to, e.g., "sales order number."

In one embodiment, the processor 102 generates a graphical user interface (GUI) including a search query window 140 on the display 104. In some embodiments, the query window may accept an unstructured query to be directed at structured data 150. Processor 102 receives the unstructured query via the query window 140 of the GUI.

As previously noted, to search structured sources, it is necessary to provide a recognized attribute and a corresponding attribute value. Structured requests have a rigid format and are not conducive to the use of natural language, synonyms, acronyms, etc. To permit the searching of structured data using an unstructured search query, processor 102 includes a query analyzer 110. An unstructured search query received in the processor 102 is passed to query analyzer 110. Query analyzer 110 parses the query in semantic layer 120 to identify the individual search terms entered in the unstructured query. Semantic layer 120 includes a comparison engine 132 which compares the individual search terms identified with the possible input attributes associated with the structured data 150. To the extent that one or more input attributes are found, those attributes may be passed to the indexer 122 which will create a value to use in accessing index 154 as described in more detail below.

For those search terms, which are not input attributes, a lookup table (LUT) 134 is provided in semantic layer 120 to permit input attributes corresponding to the semantic attributes to be found. LUT 134 includes information from map 152 to allow the rapid translation of semantic attributes to input attributes without directly accessing the map 152. In an alternative embodiment, semantic layer 120 may query the map 152 directly for each of the semantic attributes, to identify corresponding input attributes.

The corresponding input attributes are passed to indexer 122. In one embodiment, indexer 122 includes a hash engine 136, which individually hashes each input attribute existing in or derived from the search query by semantic layer 120. The individual hash values of each of the individual input attributes are then added by adder 138 within indexer 122. This sum of the hash value is then used to search the index 154 to identify the best structured search request corresponding to the unstructured search query received through query window 140. By using the sum of the hash values as the index value, dependence on order of the search terms is eliminated. The request found through index 154 may then be applied to the structured data 150, and the results returned for display on display 104.

However, to the extent that it is not possible to resolve one or more search terms or other ambiguities that exist in identification of the structured query, suggestion engine 114 may generate a window 142 on display 104 requesting the user clarify a desired term attribute or a complete query. Based on the response to the suggestion, mapper 112 may add additional relations to map 152. These relations may also be propagated to LUT 134. This effectively allows the system to learn additional semantic attributes over time. In some embodiments, a user may be permitted to change the mapping of a semantic attribute. For example, if order is mapped purchase order a user may be allowed to remap it to, e.g., sales order. Such remapping may be made user specific or global depending on the rights of the requesting user.

Figure 2A:
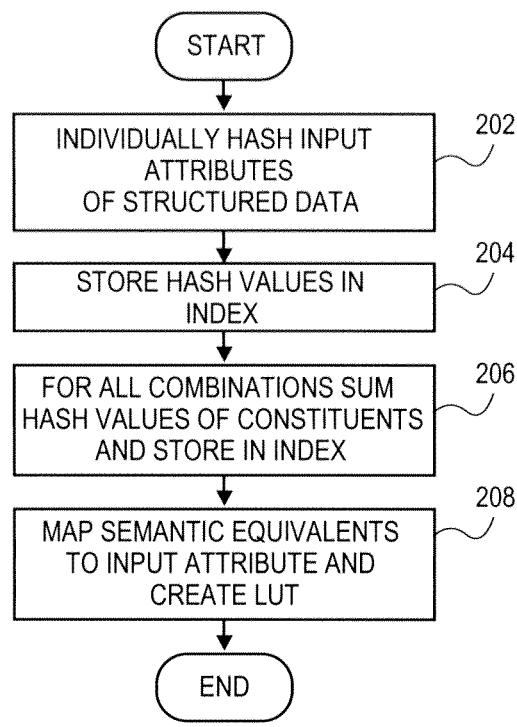
FIG. 2A and 2B are flow diagrams of operation in one embodiment of the invention.

FIG. 2A is a flow diagram of index creation in one embodiment of the invention. At block 202, the possible input attributes for the structured data are individually hashed. At block 204 the hash values for each of the input attributes are stored in an index. At block 206, for all combinations of possible input attributes, the sum of the hash values of the constituents are stored in the index. Thus, for example, in a system with three possible structured input attributes the index would include the hash value for the three attributes individually, the sum of hash values for each combination of pairs of attributes, and the sum of the hash values of all three attributes. In this simple example there would be seven values in the index corresponding to seven different structured requests. Because the sum of the hash values is used rather than hashing the string, the order of the appearance of the search terms has no effect on the index value. At block 208, semantic equivalents of the input attributes are mapped to the corresponding attribute and a lookup table is created to facilitate rapid evaluation of semantic attributes. In one embodiment, indexing and semantic mapping occurs primarily at design/customization time. Further indexing and mapping may occur if request definitions or semantic definitions are expanded or modified on an organizational level. Additionally, as described below with reference to FIG. 2B, additional mappings may be done at an individual basis during run time.

Figure 2B:
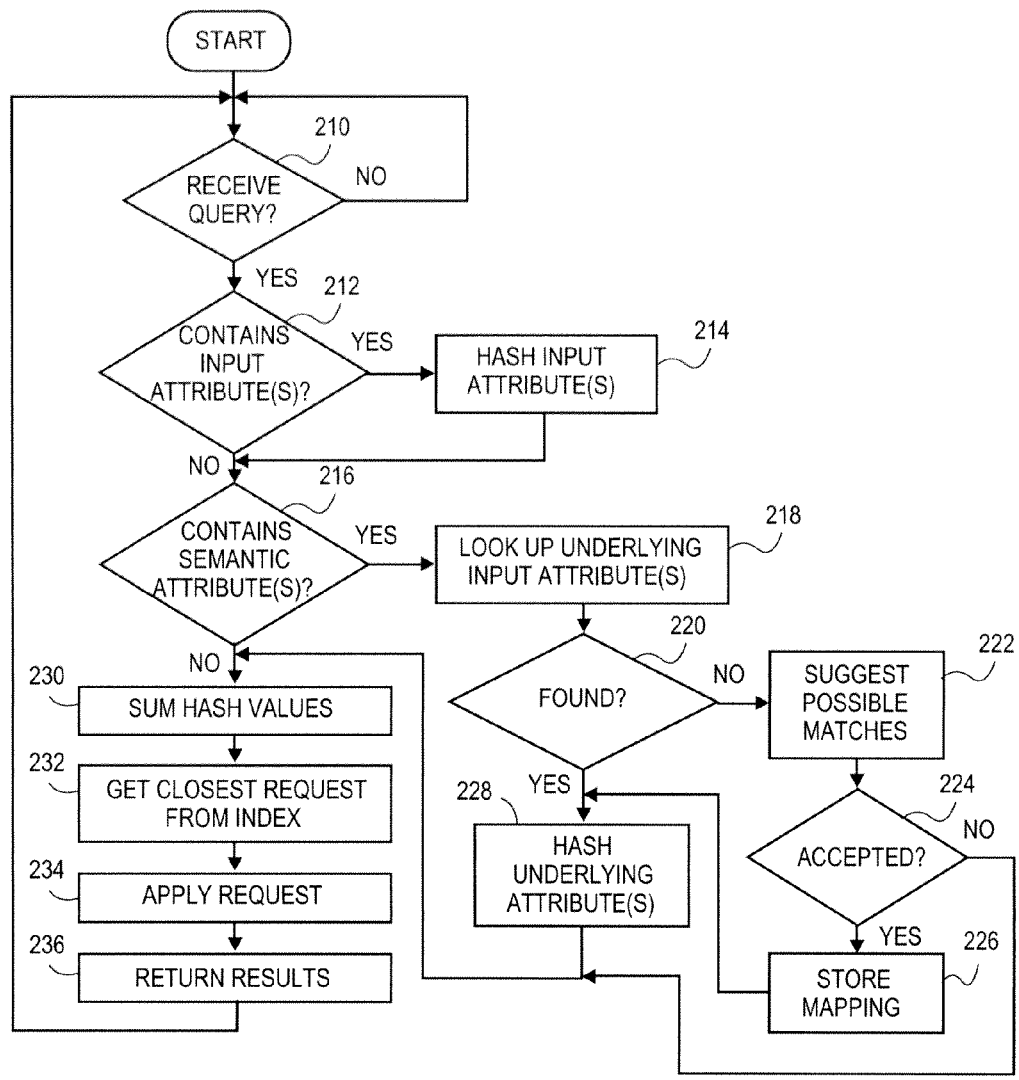

FIG. 2B is a flow diagram of runtime operation in one embodiment of the invention. At block 210, a determination is made if the query has been received. If a query has been received it is evaluated to identify if it contains input attributes at decision block 212. If input attributes are contained, those attributes are hashed at block 214.

If there are no input attributes or once input attributes have been identified and hashed, a determination is made at decision block 216 whether semantic attributes exist within the search query. If semantic attributes are identified within the search query, these attributes are applied to a lookup table to identify the underlying input attributes corresponding to the semantic attributes at block 218. At decision block 220 a determination is made whether corresponding input attributes have been found. If no corresponding input attribute has been found, possible input attributes may be suggested to the user at block 222. A determination is made at block 224 whether the user has accepted the proposed match, if the match has been accepted mapping of that suggested match to that semantic attribute is stored and the LUT may be updated at block 226. If the proposed match is not accepted, that term may be ignored.

After storing the mapping or if the underlying input attribute is found in the initial case, the underlying attribute is hashed at block 228. At block 230 the hash value of all identified underlying attributes and input attributes are summed. The sum of the hash values is used to identify the closest structured request from the index at block 232. In one embodiment, the search of the index may be limited by the number of input attributes found from the search query. For example, if three attributes are present, searching of requests having two or one attribute is avoided. Where no exact match is found, additional iterations may be performed by subtraction term has values of one or more attributes until a suitable match is found. By way of example, if five input attributes exist or are derived from the unstructured query, but the sum of the hash values of those five attributes is not found in the index, the system will search for each of the sums of four attributes. To the extent that more than one request is identified thereby, in some embodiments, the system will apply both requests and return the union or the intersection of those requests. In one embodiment, where no exact match is found, the search request with the greatest number total search terms is deemed the closest.

Once the structure of the search request has been identified, that request is then applied to the structured data at block 234. At block 236 the results are then returned to the user.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method comprising:
creating an index of structured input attributes to a unique value for each attribute and each combination of attributes;
mapping a set of semantic attributes to the input attributes
accepting an unstructured search query from a requester;
analyzing the query in a computer to identify a best structured request, wherein analyzing includes hashing any input attribute in the search query, transforming any semantic attribute in the search query to an underlying input attribute, hashing any underlying input attribute, summing hash values of all input attributes and underlying input attributes, and searching the index based on the sum of the hash values;
applying the structured request to a set of structured data;
returning, to the requester, results of the application of the structured request to the set of structured data;
suggesting, to the requester, an input attribute for a semantic attribute for which no mapping exists; and
mapping the semantic attribute to an input attribute corresponding to an accepted suggestion.

2. The method of claim 1 wherein the creating comprises:
hashing each attribute; and
summing the hashes of each constituent attribute of a combination.

3. The method of claim 1, further comprising restricting the search by the number of total attributes in the search query.

4. The method of claim 1 further comprising accepting a remapping of a semantic attribute to a different input attribute.

5. A system comprising:
a processor;
an electronic display;
a graphical user interface (GUI) to accept an unstructured search query in a search window;
a persistent storage unit retaining at least one set of structured data;
an indexer to create an index of structured input attributes to a unique value for each attribute and each combination of attributes; and
a query analyzer to convert the unstructured query into a best structured request by hashing any input attribute in the search query, transforming any semantic attribute in the search query to an underlying input attribute; hashing any underlying input attribute, summing hash values of all input attributes and underlying input attributes and searching the index based on the sum of the hash values to find a closest match;
a mapper to map semantic attributes to input attributes; and
a suggestion engine to suggest, through the GUI, possible mappings between semantic attributes and input attributes.

6. The system of claim 5 wherein the query analyzer comprises:
a semantic layer; and
an attribute indexer.

7. The system of claim 6 wherein the attribute indexer comprises:
a hash engine; and
an adder.

8. The system of claim 5 wherein the semantic layer comprises:
a lookup table; and
a comparison engine.

9. A non-transitory computer readable medium having instructions stored therein which when executed by a processor cause the processor to:
create an index of structured input attributes to a unique value for each attribute and each combination of attributes;
map a set of semantic attributes to the input attributes;
accept an unstructured search query from a requester;
analyze the query in a computer to identify a best structured request, the analysis including hashing any input attribute in the search query, transforming any semantic attribute in the search query to an underlying input attribute; hashing any underlying input attribute, summing hash values of all input attributes and underlying input attributes and searching the index based on the sum of the hash values;
apply the structured request to a set of structured data;
return, to the requester, results of the application of the structured request to the set of structured data;
suggest, to the requester, an input attribute for a semantic attribute for which no mapping exists; and
map the semantic attribute to an input attribute corresponding to an accepted suggestion.

10. The computer readable medium of claim 9 wherein the instructions causing the computer to create comprise instructions causing the processor to:
hash each attribute; and
sum the hashes of each constituent attribute of a combination.

11. The computer readable medium of claim 9 having further instructions thereon that cause the processor to:
restrict the search by the number of total attributes in the search query.

12. The computer readable medium of claim 9 having further instructions thereon that cause the processor to:
accept a remapping of a semantic attribute to a different input attribute.

\* \* \* \* \*